United States Patent
Li et al.

(10) Patent No.: US 12,349,636 B2
(45) Date of Patent: Jul. 8, 2025

(54) METHOD FOR CULTIVATING TUNG TREE SEEDLING BY HYPOCOTYL GRAFTING

(71) Applicant: CENTRAL SOUTH UNIVERSITY OF FORESTRY AND TECHNOLOGY, Changsha (CN)

(72) Inventors: Ze Li, Changsha (CN); Yeyao Liu, Changsha (CN); Hanyu Shu, Changsha (CN); Haoyu Wang, Changsha (CN); Renrong Peng, Changsha (CN); Hui Zhang, Changsha (CN); Fangfang Ma, Changsha (CN); Chengrui Luo, Changsha (CN); Xiaofeng Tan, Changsha (CN); Wende Yan, Changsha (CN); Lin Zhang, Changsha (CN); Hongxu Long, Changsha (CN); Lingli Wu, Changsha (CN); Xiaoqin Mi, Changsha (CN); Lesheng Li, Changsha (CN)

(73) Assignee: CENTRAL SOUTH UNIVERSITY OF FORESTRY AND TECHNOLOGY, Changsha (CN)

( * ) Notice: Subject to any disclaimer, the term of this patent is extended or adjusted under 35 U.S.C. 154(b) by 0 days.

(21) Appl. No.: 18/288,842

(22) PCT Filed: Dec. 14, 2022

(86) PCT No.: PCT/CN2022/139027
§ 371 (c)(1),
(2) Date: Oct. 30, 2023

(87) PCT Pub. No.: WO2023/151380
PCT Pub. Date: Aug. 17, 2023

(65) Prior Publication Data
US 2024/0196807 A1 Jun. 20, 2024

(30) Foreign Application Priority Data

Feb. 11, 2022 (CN) .................... 202210127229.6
Jul. 22, 2022 (CN) .................... 202210866531.3

(51) Int. Cl.
*A01G 2/35* (2018.01)
*A01G 17/00* (2006.01)

(52) U.S. Cl.
CPC ............. *A01G 2/35* (2018.02); *A01G 17/005* (2013.01)

(58) Field of Classification Search
CPC ........... A01G 2/35; A01G 17/005; A01G 2/30
(Continued)

(56) References Cited

U.S. PATENT DOCUMENTS

2017/0142920 A1* 5/2017 Beekenkamp ........... A01G 2/35

FOREIGN PATENT DOCUMENTS

| CN | 103461008 A | 12/2013 |
| CN | 103461012 A | 12/2013 |

(Continued)

OTHER PUBLICATIONS

Year of the Durian, "How to Graft Durian Hypocotyl Tutorial", Nov. 18, 2017, YouTube; https://www.youtube.com/watch?v=SHKItSvJ8V8 (Year: 2017).*

*Primary Examiner* — Kimberly S Berona
*Assistant Examiner* — Erica Michelle Huebner
(74) *Attorney, Agent, or Firm* — Bayramoglu Law Offices LLC (57) ABSTRACT

A method for cultivating a Tung tree seedling through hypocotyl grafting, includes selection of a sand storage time of a rootstock (*Vernicia montana* Lour.) seed, seedbed
(Continued)

construction, scion collection, scion cutting, rootstock cutting, bandaging, transplantation and management, and the like.

13 Claims, 4 Drawing Sheets

(58) Field of Classification Search
USPC .............................................................. 47/7
See application file for complete search history.

(56) References Cited

FOREIGN PATENT DOCUMENTS

| | | | | | |
|---|---|---|---|---|---|
| CN | 104255309 | A | * | 1/2015 | ............... A01G 1/06 |
| CN | 104904480 | A | | 9/2015 | |
| CN | 105453902 | A | | 4/2016 | |
| CN | 105594540 | A | * | 5/2016 | ........... A01G 17/005 |
| CN | 106416896 | A | * | 2/2017 | ........... A01G 17/005 |
| CN | 107135868 | A | * | 9/2017 | |
| CN | 107667861 | A | * | 2/2018 | ............. A01H 4/008 |
| CN | 110447405 | A | * | 11/2019 | ........... A01G 17/005 |
| CN | 114009233 | A | * | 2/2022 | |
| CN | 115349362 | A | | 11/2022 | |
| JP | 2008000063 | A | | 1/2008 | |

* cited by examiner

METHOD FOR CULTIVATING TUNG TREE SEEDLING BY HYPOCOTYL GRAFTING

CROSS REFERENCE TO THE RELATED APPLICATIONS

This application is the national phase entry of International Application No. PCT/CN2022/139027, filed on Dec. 14, 2022, which is based upon and claims priority to Chinese Patent Applications No. 202210127229.6, filed on Feb. 11, 2022, and No. 202210866531.3, filed on Jul. 22, 2022, the entire contents of which are incorporated herein by reference.

TECHNICAL FIELD

The present disclosure belongs to the field of asexual propagation-based seedling cultivation for Tung tree, and specifically relates to a method for cultivating a Tung tree seedling by hypocotyle grafting.

BACKGROUND

Tung tree (*Vernicia fordii* (Hemsl.)) is a deciduous tree of *Vernicia* Lour. of Euphorbiaceae. Tung tree is one of the four major oil-bearing woody plant species in China and also an important industrial oil-bearing plant species in China. Seeds of Tung tree have a high oil content, and dry kernels of seeds of Tung tree have an oil content as high as 60% to 70%. Tung oil is a top-quality dry oil among vegetable oils, and has characteristics such as fast drying, low specific gravity, excellent gloss, non-conductivity, cold and heat resistance, corrosion resistance, rust resistance, acid resistance, alkali resistance, environmental friendliness, safety and non-toxicity, and excellent film-forming performance. Tung oil is a high-quality raw material for production of environmentally friendly coatings, and is also a raw material for synthesis of novel composite materials. Tung oil is widely used in industry, construction, printing, or the like. With the constant attention to environmental issues in China, tung oil, as a biomass energy, has become increasingly important in production and application. Therefore, the development of the Tung tree industry plays an important role in ensuring the energy safety of China.

Since 2005, Professor Tan Xiaofeng of Central South University of Forestry and Technology has led a team to conduct the collection, preservation, evaluation and utilization, and improved variety breeding of Tung tree germplasm resources. More than 500 Tung tree germplasm resources preserved by various local research institutions across China were mainly collected, and numbered and stored in the Forest Ecological Research and Experiment Station of Xiangxi Autonomous Prefecture for biological investigation and improved variety breeding, and 4 excellent clones were finally bred. In April 2020, the 4 excellent clones were approved by Forest Variety Approval Committee of Hunan Province and named "Huatong No. 1", "Huatong No. 2", "Huatong No. 3", and "Huatong No. 4", respectively, and were popularized on a large scale in suitable areas. Unfortunately, asexual propagation technology system has not yet been established for the 4 varieties. These varieties are popularized mainly by seed propagation, and an offspring population cannot retain the excellent traits of a female parent, which is not conducive to the healthy development of Tung tree industry. In addition, Tung tree plants at an age of 10 or more years easily die, and some germplasm resources must be preserved through continuous grafting. Therefore, the promotion of asexual propagation (grafting) technologies for Tung tree is of great significance in guaranteeing the development of Tung tree industry, and in particular, breeding methods that can be used for actual production and allow industrialization need to be developed urgently.

SUMMARY

Technical Problem

At present, the conventional seedling cultivation method for Tung tree is mainly seed propagation, and asexual propagation technologies for Tung tree are immature and cannot be used for industrial seedling cultivation. The seed propagation leads to offspring variation in Tung tree seedlings, and cannot retain the excellent traits of a female parent. The asexual propagation technologies can retain the excellent traits of a female parent. The asexual propagation technologies for Tung tree mainly include tissue culture, cutting, and grafting. Studies on the tissue culture technology for Tung tree are mainly conducted as follows: sterile seedlings are cultivated from seed embryos, and then explants such as leaves, hypocotyls, and petioles of the sterile seedlings are used to induce adventitious buds to obtain regenerated plants (Tan Xiaofeng et al., 2013; and Lin Qing et al., 2014). These studies are mainly conducted to provide a complete tissue culture system for a transgenic technology of Tung tree. However, tissue culture seedlings of Tung tree cultivated from bud-bearing stem segments are still at a laboratory stage and cannot be used for industrial seedling cultivation (a rapid propagation technology of tissue culture from bud-bearing stem segments of *Vernicia montana* Lour.). The cutting technology for Tung tree seedling cultivation has a low rooting rate, with a maximum rooting rate only of 56.67%, and seedlings cultivated by the cutting technology are prone to root rot during growth. The cutting technology has many problems such as low seedling survival rate, poor quality, susceptibility to diseases, and poor afforestation effect. Therefore, the cutting technology for Tung tree seedling cultivation has not been used in actual production practice (Lan Jinxuan et al., 2021). The traditional grafting technologies for Tung tree seedling cultivation mainly includes stem grafting and bud grafting. The stem grafting technology requires a long seedling cultivation cycle, and it takes at least two years from rootstock cultivation to transplantation; and the stem grafting needs to be conducted in a nursery field, with difficult operations, a high grafting site, and a high production cost. Thus, the stem grafting technology for Tung tree has not been industrialized for popularization and application. The bud grafting technology is mainly conducted on a plant after colonization, and involves scattered grafting sites, high technical requirements, and a low grafting speed, and a survived grafted seedling is easy to break at a grafting interface in weather such as strong wind, resulting in a poor afforestation effect. Thus, the bud grafting technology for Tung tree is currently less used in production. Since the above asexual propagation technologies are immature, improved Tung tree varieties are currently propagated and popularized by sowing to cultivate seedlings.

The present disclosure is mainly intended to provide a method for cultivating a Tung tree seedling by hypocotyle grafting, and through this method, an asexual propagation technology system for Tung tree is successfully established, which not only overcomes the above technical problems, but also effectively improves a grafting survival rate. In order to improve a grafting survival rate and ensure the robust growth of a grafted seedling, key factors affecting a grafting survival rate are explored thoroughly in the present disclosure, and finally optimal factors are combined to make a grafting survival rate reach 95% or more. This technology has a high seedling survival rate, greatly shortens a seedling cultivation cycle (it only takes 6 months from rootstock cultivation to seedling transplantation, and it takes nearly 2 years for the traditional grafting), and greatly reduces a cost of production, management, and maintenance. In addition, the use of a *Vernicia montana* Lour. seedling as a rootstock can prevent the bottleneck problem that blight may cause a low yield and low efficiency of Tung tree, and has excellent application values and market prospects.

A grafted plant obtained by a traditional grafting method (bud grafting) for Tung tree is easy to break at a grafting interface; and when the stem grafting is conducted, because a scion is thick, a rootstock for grafting must be cultivated one year in advance. These grafting methods have production problems such as long cycle and high cost, which can be solved by the present disclosure. The present disclosure has a short rootstock cultivation time, simple grafting operations, a high grafting efficiency, and a high survival rate, greatly shortens a cycle of asexual propagation-based seedling cultivation for Tung tree.

At present, there are no reports about hypocotyle grafting for the Tung tree seedling, and there are only some patents about the traditional grafting for the Tung tree seedling:

D1: 201310398684.0: High-Site Bud Grafting Method for Tung tree; and

D2: 201310458017.7: *Vernicia montana* Lour. Grafting Method.

Compared with the traditional grafting methods, the present disclosure has significant advantages, such as significantly-shortened cultivation cycle and significantly-improved grafting rate.

TABLE 1

Comparison of seedling cultivation cycles of different grafting technologies

| Patent | Time required for rootstock cultivation (month) | Time required from grafting to seedling emergence (month) | Total time (month) | Grafting efficiency (plant/person/day) |
|---|---|---|---|---|
| D1 | 12 | — | 12 or more | 80 |
| D2 | 12 | 10 | 22 | 170 |
| Hypocotyle grafting for the Tung tree seedling | 1 | 5 | 6 | 600 |

First, in the present disclosure, it only takes 25 d to 50 d from sand storage of *Vernicia montana* Lour. seeds to grafting, which greatly shortens a cultivation cycle of a rootstock, and reduces a management cost of a rootstock and a technical risk of mold rot of the seeds. Second, after important impact factors related to hypocotyle grafting for the Tung tree seedling are explored, a grafting survival rate can reach 95% or more, indicating that the grafting survival rate is greatly improved. Third, the hypocotyle grafting for the Tung tree seedling can be conducted in the late May to the end of July, and a grafting period of Tung tree is extended through sand storage of rootstocks at different stages and a hypocotyle grafting technology. Studies have shown that a survival rate of hypocotyle grafting for the Tung tree seedling in May to July is high, where a survival rate of hypocotyle grafting for the Tung tree seedling in June is the highest; and when the grafting is conducted in the late May to the end of July, the peak employment period is avoided, which solves the problems of employment concentration and labor shortage. Fourth, when the hypocotyle grafting for the Tung tree seedling is conducted, only a seedbed with a height of 10 cm to 20 cm is required to prevent the normal growth of a grafted seedling from being affected by excessive rainwater. The hypocotyle grafting for the Tung tree seedling reduces a production cost and the difficulty of seedling transplantation, and facilitates the maintenance and management after grafting.

In addition, the normal sand storage of tree seeds is conducted in winter, that is, the low-temperature stratification treatment needs to be conducted in winter; and the seeds germinate around the beginning of summer. A large number of methods for propagation and popularization of Tung tree seedlings in various regions and statuses thereof have been investigated in the early stage, and many problems have been found. In view of the industrial development problem that it is difficult to popularize the asexual propagation technology for Tung tree, the present disclosure comprehensively considers the biological characteristics and growth habits of Tung tree, that is, Tung tree blooms in April, begins to shoot in May, has a semi-woody shoot (a state suitable for grafting) until the end of May to June, or the like. The deliberate delay of sand storage of Tung tree seeds to early April shortens a sand storage duration of Tung tree seeds, and more importantly, when the sand storage is delayed, a rootstock seedling germinated in May has a very thick hypocotyl, which just solves the technical problem that Tung tree shoots are thick, and an aboveground part of a rootstock seedling is relatively thin and cannot match a scion. Moreover, after the sand storage is delayed, a germination stage of seeds coincides with a growth stage of a semi-woody graft of Tung tree, which solves the technical problem that a scion is still not semi-woody and cannot be used for grafting when Tung tree seeds undergoing conventional sand storage germinate before the beginning of summer, and can make full use of semi-woody shoots of Tung tree for asexual propagation-based seedling cultivation of an improved Tung tree variety. Therefore, the method for delaying sand storage to allow asexual propagation of Tung tree in the present disclosure is an innovative result of years of observation and experiments, and can be closely combined with production practice. Compared with the above patents, the present disclosure has advantages such as high grafting survival rate, simple operations, short cultivation cycle, long grafting time, low cost, robust seedling growth, and high availability of rootstocks and scions, can solve the key bottleneck problem that the asexual propagation for Tung tree seedling cultivation cannot be industrialized, and has excellent economic benefits and market prospects.

Technical Solutions

The present disclosure is mainly intended to solve the key production problems that the current grafting-based seedling cultivation technology for Tung tree is immature and has a low production efficiency, a long cultivation cycle, and a low survival rate. In view of this, the present disclosure provides a grafting technology for efficient cultivation of an improved Tung tree seedling, mainly including key steps such as cultivation and selection of a rootstock, collection of a scion, and treatment of the scion. In the experiments of the present disclosure, the characteristic that a hypocotyl of a Tung tree seedling is thicker than an aboveground part of the Tung tree seedling solves the production problem that a Tung tree scion is thick and thus a rootstock obtained after one year of cultivation is required to match the scion; the use of a *Vernicia montana* Lour. seedling as a rootstock just solves the production problem that Tung tree is prone to root rot at a later stage; and after a grafted seedling is cultivated for 3 months, a grafting film is cut vertically by a knife, such that the grafting film will automatically fall off with the healing of a grafting interface, which solves the labor problem of grafting film removal in the traditional grafting. This technology is easy to implement, and can improve the grafting efficiency, significantly shorten a seedling cultivation cycle, improve a seedling survival rate, and reduce a seedling cultivation cost; and a seedling cultivated by this technology can grow robustly, which provides an efficient and high-quality production technology for industrial seedling cultivation of Tung tree.

The present disclosure is implemented in the following way:

A method for cultivating a Tung tree seedling by hypocotyle grafting is provided, including the following steps:

(1) rootstock cultivation: from early April to late June of a year, subjecting a *Vernicia montana* Lour. seed to sand storage for 25 d to 50 d before grafting until an epicotyl is exposed above a sand surface and a true leaf grows;

(2) scion collection: from May to July of the year, collecting a semi-woody shoot with robust growth, full buds, and no diseases and pests of the year as a scion;

(3) scion cutting: cutting a lower part of the scion with an axillary bud to form a wedge-shaped bevel;

(4) rootstock cutting: for grafting, cutting off an upper plumular axis of the rootstock at a position with a closest thickness to the scion, and cutting a grafting interface downward longitudinally on a section of a hypocotyl in a direction perpendicular to a transverse section;

(5) grafting: inserting a cut scion into the grafting interface of the rootstock, making the rootstock and the scion tightly joined together with at least one pair of cambium layers aligned, and bandaging for fixation;

(6) transplantation: before the grafting, arranging a shading net above a seedbed as a whole; transplanting a grafted seedling to the seedbed with the grafting interface higher than a soil plane, and after the transplantation is completed, watering for the first time; and when an axillary bud length of the grafted seedling reaches 10 cm or more, removing the shading net to improve photosynthetic efficiency; and (7) management: after the grafted seedling is transplanted, watering to keep a soil at a specified humidity; and after the grafted seedling is cultivated for 50 d, spraying urea on leaves of the grafted seedling.

A specific process of the rootstock cultivation in step (1) is as follows: selecting a sunny slope with a high altitude and excellent water drainage as a sand storage site; spreading seeds on a clean river sand layer with a thickness of 18 cm to 22 cm, spreading a river sand layer with a thickness of 8 cm to 12 cm on the seeds, and watering to keep the river sand at a humidity of 8% to 10%, where the seeds are prevented from overlapping with each other to cultivate robust seedling rootstocks; and preferably selecting a robust seedling with a hypocotyl diameter of 0.8 cm or more for grafting.

A specific process of the rootstock cultivation in step (1) is as follows: subjecting seeds to sand storage under natural conditions for 25 d to 50 d to obtain rootstocks for grafting, where from early April to late May, because a temperature is low and a long time is required for the seeds to germinate, the sand storage is conducted for 45 d to 50 d; and from early June to late June, because a temperature is high and the seeds germinate rapidly, the sand storage is conducted for 25 d to 30 d.

In step (2), after the scion is collected, leaves are removed, and a petiole with a length of 0.1 cm to 1.0 cm and preferably 0.5 cm is left for grafting.

A specific process of the scion cutting in step (3) is as follows: cutting the scion into a 3 cm to 5 cm-long segment with a single axillary bud, and cutting a lower part of the segment to form a wedge-shaped bevel with a vertical length of 1 cm to 2 cm, preferably, the axillary bud of the scion is 1 cm from a top and 3 cm from a bottom, and the wedge-shaped bevel has a vertical length of 1.5 cm.

A specific process of the rootstock cutting in step (4) is as follows: for grafting, selecting a rootstock with robust growth and a hypocotyl diameter of 0.8 cm or more, cutting off an upper plumular axis of the rootstock at a position 5 cm to 8 cm from a root of the rootstock, and cutting a 1.2 cm to 2 cm-long grafting interface downward longitudinally on a section of a hypocotyl in a direction perpendicular to a transverse section, preferably, a vertical joining length between the rootstock and the scion is 1.5 cm.

Step (5) specifically includes: inserting the cut scion into the grafting interface of the rootstock, making the rootstock and the scion tightly joined together with at least one pair of cambium layers aligned, and bandaging with a grafting film for fixation, where when the grafting film is used for fixation, one side of the grafting film is fixed, the other side of the grafting film winds around a cut to wrap the cut tightly, and after the fixation is completed, a knot is tied; and immersing a base of a radicle in water for moisturization.

The transplantation in step (6) specifically includes: preparing a seedbed with a height of 10 cm to 20 cm and preferably 15 cm and a width of 0.9 m to 1.2 m and preferably 1.2 m for transplantation; at a transplantation density defined by: plant spacing: 15 cm to 20 cm, row spacing: 20 cm to 30 cm, and reserved row edge width: 4 cm to 6 cm, transplanting the grafted seedling with the grafting interface higher than a ground to prevent rot of the scion; after the transplantation is completed, watering for the first time, and arranging the shading net above the seedbed as a whole for shading; and when the axillary bud length of the grafted seedling reaches 10 cm or more, removing the shading net to improve photosynthetic efficiency.

In step (6), a seedling medium used in the seedbed is obtained by blending 5% to 10% of peat soil into yellow soil; and a shading degree for the seedbed should ensure a light transmittance of 3% to 10% and a humidity of 60% or more.

The management in step (7) specifically includes: after the transplantation, keeping the soil at a humidity of 60% or more; after the grafted seedling is cultivated for 50 d, spraying urea with a mass concentration of 0.1% to 0.4% to replenish nutrients, gradually enhancing light, and removing buds and weeds in time; and after the grafted seedling is cultivated for 3 months, cutting the grafting film, such that the grafting film automatically falls off with the growth of a callus at the interface to prevent a strangulation mark from occurring at a grafting site because the grafting film hinders the normal healing of the interface.

Beneficial Effects

Figure 1:
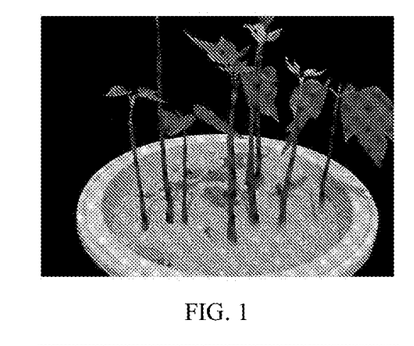
FIG. 1 is a picture of cultivation and germination of the Tung tree rootstocks in the present disclosure.
Figure 2:
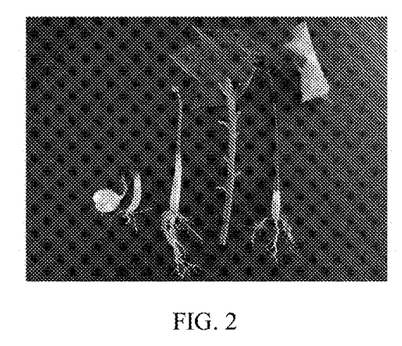
FIG. 2 is a picture illustrating that the hypocotyl of the Tung tree rootstock in the present disclosure has a similar thickness to a scion.
Figure 3:
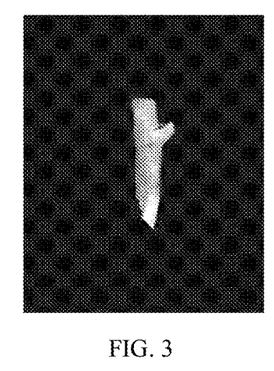
FIG. 3 is a picture of the cut Tung tree scion in the present disclosure.
Figure 4:
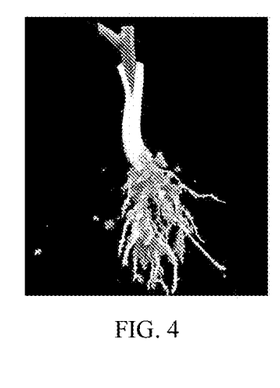
FIG. 4 is a picture of the Tung tree rootstock and the Tung tree scion that are joined together in the present disclosure.
Figure 5:
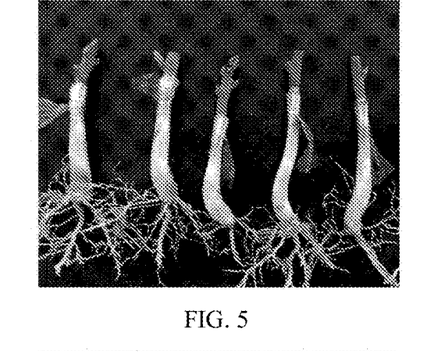
FIG. 5 is a picture of grafted Tung tree seedlings in the present disclosure.
Figure 6:
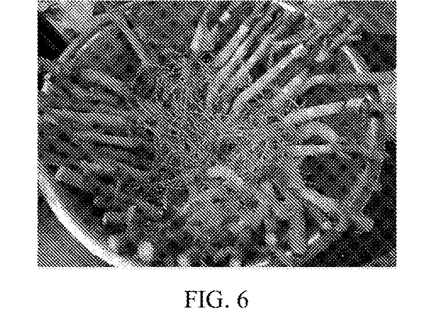
FIG. 6 is a picture of grafted Tung tree seedlings placed in a water-filled basin to be transplanted in the present disclosure.
Figure 7:
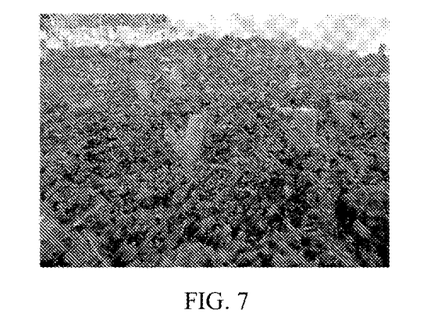
FIG. 7 is a picture of grafted Tung tree seedlings with axillary buds beginning to germinate after growing for 5 d in the present disclosure.
Figure 8:
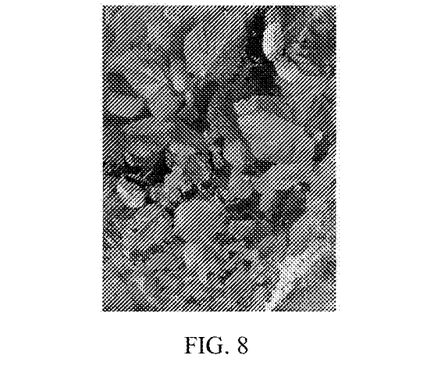
FIG. 8 is an overall picture of grafted Tung tree seedlings growing for 1 month in the present disclosure.
Figure 9:
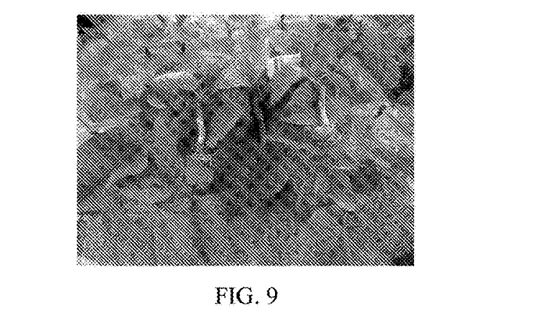
FIG. 9 is a picture of grafted Tung tree seedlings that grow for 1 month and are pulled out from the soil in the present disclosure.
Figure 10:
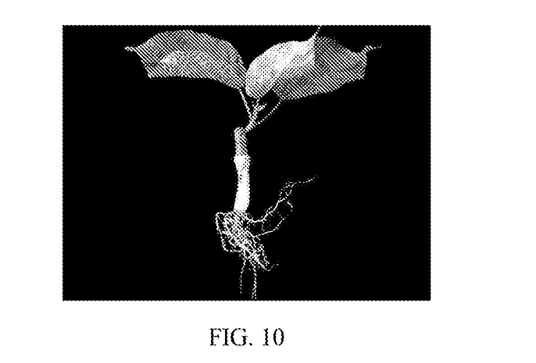
FIG. 10 is a picture of a grafted Tung tree seedling on which a wound is healed after growing for 1 month in the present disclosure.
Figure 11:
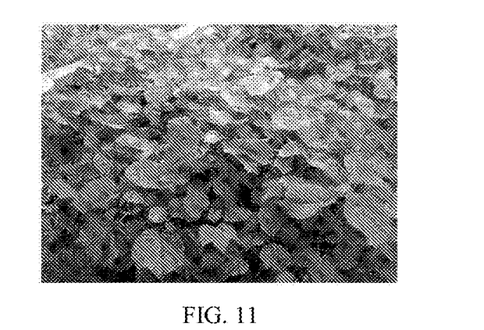
FIG. 11 is a picture of grafted Tung tree seedlings growing for 3 months in the present disclosure.
Figure 12:
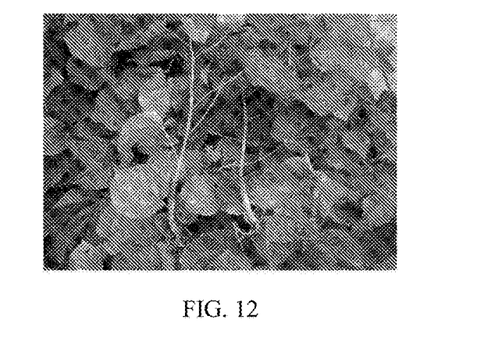
FIG. 12 is a picture of grafted Tung tree seedlings that grow for 3 month and are pulled out from the soil in the present disclosure.
Figure 13:
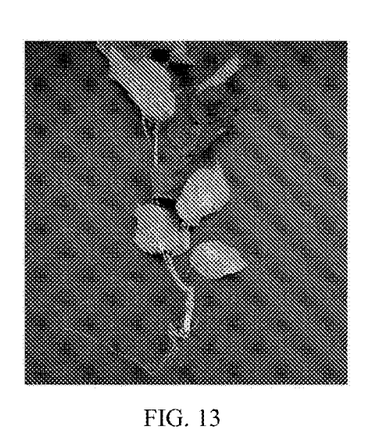
FIG. 13 is a picture of a single grafted Tung tree seedling growing for 3 months in the present disclosure (a height of the seedling is 50 cm or more)
Figure 14:
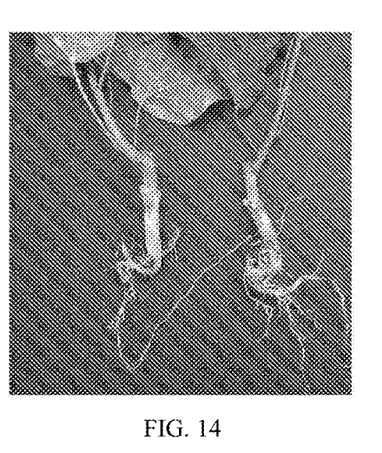
FIG. 14 is a picture of grafting interfaces on grafted Tung tree seedlings growing for 3 months in the present disclosure.

1. The traditional grafting methods for Tung tree include stem grafting and bud grafting. These two grafting methods allow grafting survival rates of 42.00% and 82.44%, respectively. However, in the two grafting methods, a grafting site is generally 10 cm or more higher than a ground and a grafting interface has always existed after grafting; and because Tung tree has a pith, a grafted plant is easy to break at a wound position when encountering strong wind during growth. The present disclosure adopts a method for split grafting of a hypocotyl. Due to a strong activity of the hypocotyl, a grafting interface will be completely wrapped by a callus produced by a rootstock during growth (as shown in FIG. 6). Therefore, the present disclosure solves the scientific problem that grafted Tung tree is easy to break at a grafting site.

2. When the rootstock used in the present disclosure is cultivated through sand storage, the sand storage is conducted for 25 d to 50 d before grafting, which greatly shortens a cultivation cycle. That is, the rootstock can be used for grafting after being cultivated merely for 25 d to 50 d, which solves the problem that long-term sand storage of seeds in winter is easy to cause rot and mold. In addition, a hypocotyl of a Tung tree seedling has a strong activity, which also improves a grafting survival rate.

3. The rootstock used for grafting in the present disclosure is a hypocotyl of a *Vernicia montana* Lour. seedling, and is thicker than an aboveground part of the *Vernicia montana* Lour. seedling; and a thickness of the rootstock coincides with a thickness of a Tung tree scion, which makes a grafting interface compatible and can significantly improve a survival rate of a grafted seedling.

4. The present disclosure can significantly shorten a seedling cultivation cycle and reduce a production cost. In the traditional grafting technology, a rootstock used needs to be cultivated 1 year in advance, a scion is planted in a nursery during grafting, and a grafting interface is generally high. However, in the present disclosure, the rootstock used only needs to be cultivated for 25 d to 50 d, a grafted rootstock is separated from the soil, and operations are flexible and simple.

5. The present disclosure can improve the grafting efficiency. In the traditional grafting technology, grafting is conducted on a Tung tree or an annual Tung tree seedling in a forest, which is difficult and has low grafting efficiency. However, in the present disclosure, a *Vernicia montana* Lour. seedling is pulled out for grafting, and this grafting method is simple, has high grafting efficiency, and allows grafting of 600 plants by one person per day.

6. The present disclosure can improve a grafting survival rate. A survival rate of the hypocotyle grafting for the Tung tree seedling can reach 95% or higher, indicating a significantly-improved grafting survival rate.

7. The present disclosure extends a period available for grafting. The grafting in the present disclosure can be conducted in the 3 months of May, June, and July, with a high grafting survival rate.

8. The present disclosure reduces the production cost and seedling transplantation difficulty. In the present disclosure, there is no need to build a small plastic greenhouse, which can greatly reduce the production cost and seedling transplantation difficulty.

9. The rootstock cultivation in the present disclosure is convenient. In the present disclosure, only clean river sand is used to conduct sand storage of seeds under natural conditions for rootstock cultivation, which can simplify a disinfection link.

In summary, the present disclosure has significant advantages over the traditional grafting methods for Tung tree. Compared with the traditional grafting methods for Tung tree, the present disclosure can shorten a seedling cultivation cycle, improve a survival rate of seedlings, reduce a production cost, allow the robust growth of seedlings, involve simple operations, and greatly improve the grafting efficiency, which is convenient for industrial production and can effectively improve a dilemma faced by propagation of improved Tung tree varieties.

DETAILED DESCRIPTION OF THE EMBODIMENTS

The present disclosure is described in further detail below with reference to the example, which is not intended to limit the present disclosure.

Example 1

In order to improve a grafting survival rate, impact factors existing in a grafting process were explored, and the optimal factors obtained accordingly were adopted in all subsequent experiments. In the experiments, 30 plants were grafted per treatment, and 3 replicates were set per treatment. The following operations were conducted sequentially:

1. Collection of seeds for rootstock cultivation: Ripe fruits of an improved *Vernicia montana* Lour. mother tree were collected in mid-November, placed in a woven bag, and stacked at a shady and humid place for 2 months to 3 months until peels were softened and rotted; and then the seeds were separated, air-dried at a shady and dry place for 5 d to 7 d, then placed in a woven bag, and stored at a moist and shady place for later use.

2. Rootstock cultivation: 25 d to 50 d before grafting, the stored *Vernicia montana* Lour. seeds were subjected to the following sand storage until an epicotyl was exposed above a sand surface and a true leaf grew: a sunny slope with a high altitude and excellent water drainage was selected as a sand storage site, the seeds were spread on a clean river sand layer with a thickness of 20 cm, then a river sand layer with a thickness of 10 cm was spread on the seeds, and the sand storage was conducted under natural conditions for 25 d to 50 d during which watering was conducted once every 2 d to 3 d to keep the river sand at a humidity of 8%, where the seeds were prevented from overlapping with each other to cultivate robust seedling rootstocks; and then robust seedlings with a hypocotyl diameter of 0.8 cm or more were preferably selected for grafting.

TABLE 1

Impacts of different rootstock varieties on a grafting survival rate

| Rootstock variety | Number of grafted buds | Number of survived plants | Survival rate (%) | Growth status |
|---|---|---|---|---|
| Tung tree | 90 | 80 | 88.9 | Fast growth and excellent wound healing |
| Vernicia montana Lour. | 90 | 78 | 86.7 | Fast growth and excellent wound healing |

In the present disclosure, a lot of experiments had been conducted at a pre-test stage, and the optimal conditions for hypocotyle grafting of the Tung tree seedling were determined. Tung tree and *Vernicia montana* Lour. seedlings cultivated through sand storage were adopted as rootstocks for grafting. During the grafting, an axillary bud of a scion was 1 cm from a top and 3 cm from a bottom, a petiole was 0.5 cm long, and a vertical length of a section of a scion was 1.5 cm; and a grafted seedling was bandaged with a grafting film for fixation, then transplanted to a 15 cm-high seedbed, and cultivated. Final test results were shown in Table 1, and showed that grafting survival rates of the two rootstocks were almost equal to each other. However, because root rot had a huge harm on Tung tree in production practice and *Vernicia montana* Lour. exhibited better resistance to root rot than Tung tree, *Vernicia montana* Lour. was selected as a rootstock in the subsequent tests and actual production.

3. Scion collection: In mid-June, a semi-woody shoot with robust growth, full buds, and no diseases and pests of the year was collected as a scion.

4. Scion cutting: The scion was cut into a 4 cm-long segment with a single axillary bud, where 0.5 cm to 1.5 cm above the axillary bud, 2 cm to 3 cm below the axillary bud, and 0.1 cm to 1 cm of a petiole were left.

TABLE 2

Impacts of scions obtained under different treatments on a grafting survival rate

| | Above-bud part length (cm) | Below-bud part length (cm) | Petiole length (cm) | Number of grafted plants | Number of survived plants | Survival rate (%) |
|---|---|---|---|---|---|---|
| 1 | 0.5 | 3.0 | 0.5 | 90 | 53 | 58.9 |
| 2 | 1.0 | 3.0 | 0.5 | 90 | 66 | 73.3 |
| 3 | 1.5 | 3.0 | 0.5 | 90 | 55 | 61.1 |
| 4 | 1.0 | 2.0 | 0.5 | 90 | 62 | 68.9 |
| 5 | 1.0 | 2.5 | 0.5 | 90 | 59 | 65.6 |
| 6 | 1.0 | 3.0 | 0.5 | 90 | 71 | 78.9 |
| 7 | 1.0 | 3.0 | 0.1 | 90 | 45 | 50.0 |
| 8 | 1.0 | 3.0 | 0.5 | 90 | 62 | 68.9 |
| 9 | 1.0 | 3.0 | 1.0 | 90 | 44 | 48.9 |

When impacts of the three factors of above-bud part length, below-bud part length, and petiole length on a grafting survival rate were investigated, a *Vernicia montana* Lour. seedling was adopted as a rootstock and a vertical length of a section of a scion was set to 1.5 cm for grafting; and after the grafting was completed, a wound was bandaged with a grafting film for fixation, and a grafting interface was buried in soil on a 15 cm-high seedbed for cultivation. It can be seen from Table 2 that grafts obtained under different treatments lead to different grafting survival rates; and in order to effectively improve a grafting survival rate, it should be determined that an axillary bud of a scion is 1 cm from a top and 3 cm from a bottom and a petiole length is 0.5 cm, which can make a grafting survival rate reach 78.9%.

5. Rootstock cutting: For grafting, a rootstock with robust growth and a hypocotyl diameter of 0.8 cm or more was selected, an upper plumular axis of the rootstock was cut off at a position that was 5 cm to 8 cm from a root of the rootstock and had the closest thickness to a scion, and a grafting interface with a vertical length of 1.2 cm to 2 cm was cut downward longitudinally on a section of a hypocotyl in a direction perpendicular to a transverse section, which could make the rootstock and the scion tightly joined together.

TABLE 3

Impacts of scion sections of different vertical lengths on a grafting survival rate

| Vertical length of a section of a scion (cm) | Number of grafted plants | Number of survived plants | Grafting survival rate (%) | Growth status |
|---|---|---|---|---|
| 1.0 | 90 | 53 | 58.9 | Short section, easy deviation, and uneasy fixation |

TABLE 3-continued

Impacts of scion sections of different vertical lengths on a grafting survival rate

| Vertical length of a section of a scion (cm) | Number of grafted plants | Number of survived plants | Grafting survival rate (%) | Growth status |
|---|---|---|---|---|
| 1.5 | 90 | 68 | 75.6 | Appropriate section length and fast callus growth |
| 2.0 | 90 | 55 | 61.1 | A section length is large, and a callus can hardly wrap the entire wound |

A vertical length of a scion section has a significant impact on a grafting survival rate. In an experiment, a *Vernicia montana* Lour. seedling was adopted as a rootstock, an axillary bud of a scion was 1 cm from a top and 3 cm from a bottom, and a petiole length was 0.5 cm; and after grafting was completed, a grafting interface was bandaged with a grafting film for fixation, and then buried in soil on a 15 cm-high seedbed for cultivation. Finally, it can be seen from Table 3 that, in actual production, a scion with a wedge-shaped bevel having a vertical length of 1.5 cm should be selected for grafting with a rootstock.

6. Grafting: For grafting, a *Vernicia montana* Lour. seedling was adopted as a rootstock, and a scion was cut according to the following criteria: an axillary bud of the scion was 1 cm from a top and 3 cm from a bottom, a petiole length was 0.5 cm, and a vertical length of a section of the scion was 1.5 cm. A cut scion was inserted into a grafting interface of the rootstock, the rootstock and the scion were allowed to be tightly joined together with at least one pair of sides (cambium layers) aligned, and a joined part was bandaged with a grafting film for fixation, where when the joined part was fixed with the grafting film, one side of the grafting film was fixed, the other side of the grafting film wound around a cut to wrap the cut tightly, and after the fixation was completed, a knot was tied; and a base of a radicle was immersed in water with a height of about 1 cm in a basin for moisturization.

TABLE 4

Impacts of different bandaging materials on a grafting survival rate

| Bandaging material | Number of grafted plants | Number of survived plants | Grafting survival rate (%) | Growth status |
|---|---|---|---|---|
| Grafting film | 90 | 81 | 90.0 | A grafting interface heals quickly and a wound heals well |
| Aluminum foil | 90 | 22 | 24.4 | A grafting interface heals slowly, a rootstock tends to grow a bud-bearing shoot, and a management cost is high |

It can be seen from Table 4 that a bandaging material has a very significant impact on a grafting survival rate of Tung tree, and a survival rate under a grafting film is significantly higher than a survival rate under an aluminum foil. Therefore, the grafting film should be selected as a bandaging material for hypocotyle grafting of the Tung tree seedling.

7. Transplantation: For grafting, a *Vernicia montana* Lour. seedling was adopted as a rootstock, and a scion was cut according to the following criteria: an axillary bud of the scion was 1 cm from a top and 3 cm from a bottom, a petiole length was 0.5 cm, and a vertical length of a section of the scion was 1.5 cm; and after the grafting was completed, a joined part was bandaged with a grafting film for fixation Before the grafting, a seedbed with a width of 1.0 m and a height of 5 cm to 20 cm was prepared in a nursery field for transplantation. Generally, at a transplantation density defined by: plant spacing: 15 cm, row spacing: 20 cm, and reserved edge width: 4 cm to 6 cm, a grafted seedling was transplanted to the seedbed with a grafting interface higher than a ground to prevent rot of the scion; after the transplantation was completed, watering was conducted for the first time, and a shading net was arranged above the seedbed as a whole to allow shading for 2 months; and when an axillary bud length of the grafted seedling reached 10 cm or more, the shading net was removed to improve photosynthetic efficiency.

TABLE 5

Impacts of seedbeds with different heights on a grafting survival rate

| Seedbed height | Number of grafted plants | Number of survived plants | Survival rate (%) | Growth status |
|---|---|---|---|---|
| 5 | 90 | 56 | 62.2 | Since a seedbed height is too low, water is easy to accumulate, which seriously affects the growth of a grafted seedling |
| 10 | 90 | 58 | 64.4 | Since a seedbed height is relatively low, a growth status of a grafted seedling is average |
| 15 | 90 | 72 | 80.0 | This seedbed height is suitable for the growth of a grafted seedling |
| 20 | 90 | 62 | 68.9 | Since a seedbed height is high, a grafted seedling grows robustly |

Grafted Tung tree seedlings were transplanted to seedbeds with different heights, and after the grafted Tung tree seedlings grew for a period of time, it was observed that Tung tree seedlings on a seedbed with a height of 15 cm had the optimal growth status (as shown in Table 5). Therefore, in actual production, a seedbed with a height of 15 cm can be prepared.

TABLE 6

Impacts of different transplantation heights on a grafting survival rate

| Transplantation height | Number of grafted plants | Number of survived plants | Survival rate (%) | Growth status |
| --- | --- | --- | --- | --- |
| A grafting interface is higher than a ground | 90 | 88 | 97.8 | Robust growth and fast healing of the grafting interface |
| A grafting interface is parallel to a ground | 90 | 71 | 78.9 | Relatively-fast growth |
| A grafting interface is below a ground | 30 | 64 | 71.1 | Slow growth, and the grafting interface is prone to rot in water |

It can be seen from the data in Table 6 that a transplantation height has a significant impact on a grafting survival rate; and when grafting is conducted under the following conditions: an axillary bud of a scion is 1 cm from a top and 3 cm from a bottom, a petiole length is 0.5 cm, and a vertical length of a section of the scion is 1.5 cm, the transplantation should be conducted with a grafting interface of a grafted seedling higher than a ground.

8. Management: After the transplantation, the soil was kept at a humidity of 60% or more; after a grafted seedling was cultivated for 50 d, urea with a mass concentration of 0.3% was sprayed on leaves of the grafted seedling to replenish nutrients, light was gradually enhanced, and buds and weeds were removed in time; and after the grafted seedling was cultivated for 3 months, the grafting film was gently cut vertically by a knife, such that the grafting film would automatically fall off with the healing of a wound to prevent a strangulation mark from occurring at a grafting site because the grafting film hinders the normal healing of the interface.

After a large number of pre-tests were conducted, the present disclosure had basically determined the optimal conditions required for hypocotyl grafting of the Tung tree seedling. In order to verify and optimize these conditions, based on a single-factor experiment design, when a specified factor was explored, other factors were treated according to the optimal conditions. The growth of grafted seedlings was observed after the grafted seedlings were cultivated for 20 d, and a survival rate was counted. It can be seen from the data in the table that, when some conditions are explored, even under the optimal grafting conditions, a grafting survival rate is still low (but under the same conditions, a large number of parallel tests can determine that these optimal conditions do have a huge impact on a grafting effect). The analysis and summary of this situation shows that there are many factors affecting a survival rate of hypocotyl grafting of the Tung tree seedling; and some factors cannot be directly regulated, such as seed quality, scion, and rootstock vitality, and can only be optimized as much as possible (for example, due to impacts of a sampling time and a climate of the year, seeds, rootstocks, or scions collected in each batch cannot reach an optimal status). After many impact factors are tested, it has been found that, for hypocotyl grafting, in addition to the rootstock thickness, length of a section of a scion, above-bud part length, below-bud part length, petiole length, seedbed height, and transplantation depth, a semi-woody scion with a full bud should be selected; a rootstock pulled out from a sand should be used in time (the rootstock should be used for grafting on the day when pulled out), and cannot be placed for a too-long period of time to prevent a water loss; and a quality of seeds directly affects a grafting survival rate, and in order to improve a grafting survival rate, large full seeds should be selected for sand storage and thick rootstocks with robust growth should be selected for grafting. When various factors such seed quality, rootstock thickness, length of a section of a scion, above-bud part length, below-bud part length, petiole length, seedbed height, transplantation depth, and scion quality all meet the optimal conditions of the present disclosure, a grafting survival rate will be high, and can stably reach 95% or more and even 100% according to results of many grafting tests. Therefore, when the grafting is conducted, the conditions should be controlled as much as possible to make a grafting survival rate reach the highest level.

In summary, the hypocotyl grafting for the Tung tree seedling is preferably conducted from May to July. In early June, shoots of Tung tree are semi-woody and vigorous, a temperature is suitable, and it takes 1 month for healing of a wound after a grafted seedling is transplanted, which requires a high-temperature and high-humidity environment. The hypocotyl grafting for the Tung tree seedling can also be conducted in May, but in May, shoots of Tung tree have a low semi-lignification degree, which makes a scion easy to die due to a water loss and leads to a lower grafting survival rate than in June. A period from July to September is a key period for growth of a survived grafted Tung tree seedling. If the grafting is conducted in July and August, a survival rate is also high, but a growth cycle of a grafted seedling in the year is shortened, and a growth status of a grafted seedling in this period is significantly worse than a growth status of a grafted seedling in June. Therefore, the hypocotyl grafting for the Tung tree seedling of the present disclosure is most preferably conducted in June. In terms of rootstock selection, the present disclosure has found at an early stage that the use of Tung tree and *Vernicia montana* Lour. seedlings as rootstocks has no significant impact on a survival rate, but in order to improve the disease resistance of Tung tree, a *Vernicia montana* Lour. seedling is selected as a rootstock for hypocotyl grafting of the Tung tree seedling.

According to the above research, when a *Vernicia montana* Lour. seedling is adopted as a rootstock, a semi-woody Tung tree shoot with vigorous growth and full buds is adopted as a bud-bearing stem segment, a scion has an above-bud part length of 1 cm, a below-bud part length of 3 cm, and a petiole length of 0.5 cm, the rootstock has a diameter of greater than 0.8 cm and a section length of 1.5 cm, a joined part is bandaged with a grafting film, a seedbed has a height of 15 cm, and the transplantation is conducted with a grafting interface higher than a ground, a grafting survival rate can be as high as 95% or more. After a grafted seedling is cultivated for 3 months, the grafting film is gently cut by a blade, such that the grafting film can automatically fall off, which reduces the labor consumption. The present disclosure provides a feasible way for asexual propagation of improved Tung tree varieties in the future, and is of important practical significance for sustainable and healthy development of the Tung tree industry.

What is claimed is:

1. A method for cultivating a Tung tree seedling through a hypocotyl grafting, comprising the following steps:
   (1) a rootstock cultivation: beginning a subjection of a *Vernicia montana* Lour. seed to a sand storage in early April to late June of a given year, wherein the sand storage is performed for 25 d to 50 d before a grafting until an epicotyl is exposed above a sand surface and a true leaf grows to obtain a rootstock;
   (2) a scion collection: from May to July of the year, collecting a semi-lignified shoot with robust growth, full buds, and no diseases and pests of the year as a scion;
   (3) a scion cutting: cutting a lower part of the scion with an axillary bud to form a cut scion with a wedge-shaped bevel;
   (4) a rootstock cutting: for the grafting, cutting off an upper plumular axis of the rootstock at a position with a closest thickness to the scion, and cutting a grafting interface downward longitudinally on a section of a hypocotyl in a direction perpendicular to a transverse section to form a cut rootstock;
   (5) the grafting: inserting the cut scion into the grafting interface of the cut rootstock, making the cut rootstock and the cut scion tightly joined together with at least one pair of cambium layers aligned, and bandaging for a fixation to form a grafted seedling;
   (6) a transplantation: before the grafting, arranging a shading net above a seedbed as a whole; transplanting the grafted seedling to the seedbed with the grafting interface higher than a soil plane, and after the transplantation is completed, watering for a first time; and when an axillary bud length of the grafted seedling reaches greater than or equal to 10 cm, removing the shading net to improve a photosynthetic efficiency; and
   (7) a management: after the grafted seedling is transplanted, watering to keep a soil at a specified humidity; and after the grafted seedling is cultivated for 50 d, spraying urea on leaves of the grafted seedling.

2. The method according to claim 1, wherein the *Vernicia montana* Lour. seed is one of a plurality of *Vernicia montana* Lour. seeds;
   a specific process of the rootstock cultivation in step (1) is as follows: selecting a slope with a high altitude and water drainage as a sand storage site; spreading the plurality of *Vernicia montana* Lour. seeds on a river sand layer with a thickness of 18 cm to 22 cm, spreading a river sand layer with a thickness of 8 cm to 12 cm on the *Vernicia montana* Lour. seeds, and watering to keep a river sand at a humidity of 8% to 10%, wherein the plurality of *Vernicia montana* Lour. seeds are prevented from overlapping with each other to cultivate robust seedling rootstocks; and selecting a robust seedling with a hypocotyl diameter of greater than or equal to 0.8 cm for the grafting.

3. The method according to claim 1, wherein
   a specific process of the rootstock cultivation in step (1) is as follows: subjecting the *Vernicia montana* Lour. seed to the sand storage under natural conditions for 25 d to 50 d to obtain the rootstock for the grafting, wherein from early April to late May the sand storage is conducted for 45 d to 50 d; and from early June to late June, the sand storage is conducted for 25 d to 30 d.

4. The method according to claim 1, wherein
   in step (2), after the scion is collected, leaves of the scion are removed, and a petiole with a length of 0.1 cm to 1.0 cm is left for the grafting.

5. The method according to claim 1, wherein
   a specific process of the scion cutting in step (3) is as follows: cutting the scion into a 3 cm to 5 cm-long segment with a single axillary bud, and cutting a lower part of the 3 cm to 5 cm-long segment to form a wedge-shaped bevel with a vertical length of 1 cm to 2 cm.

6. The method according to claim 1, wherein a specific process of the rootstock cutting in step (4) is as follows: for the grafting, selecting the rootstock with robust growth and a hypocotyl diameter of greater than or equal to 0.8 cm, cutting off the upper plumular axis of the rootstock at a position 5 cm to 8 cm from a root of the rootstock, and cutting a 1.2 cm to 2 cm-long grafting interface downward longitudinally on the section of the hypocotyl in the direction perpendicular to the transverse section, and a vertical joining length between the rootstock and the scion is 1.5 cm.

7. The method according to claim 1, wherein step (5) specifically comprises: inserting the cut scion into the grafting interface of the cut rootstock, making the cut rootstock and the cut scion tightly joined together with the at least one pair of cambium layers aligned, and bandaging with a grafting film for the fixation to form the grafted seedling, wherein when the grafting film is used for the fixation, a first side of the grafting film is fixed, a second side of the grafting film winds around a cut to wrap the cut tightly, and after the fixation is completed, a knot is tied; and immersing a base of a radicle of the grafted seedling in water for a moisturization.

8. The method according to claim 1, wherein the transplantation in step (6) specifically comprises: preparing the seedbed with a height of 10 cm to 20 cm and a width of 0.9 m to 1.2 m for the transplantation; at a transplantation density defined by: a plant spacing: 15 cm to 20 cm, a row spacing: 20 cm to 30 cm, and a reserved row edge width: 4 cm to 6 cm, transplanting the grafted seedling with the grafting interface higher than a ground to prevent rot of the scion; after the transplantation is completed, watering for the first time, and arranging the shading net above the seedbed as the whole for shading; and when the axillary bud length of the grafted seedling reaches greater than or equal to 10 cm, removing the shading net to improve the photosynthetic efficiency.

9. The method according to claim 1, wherein in step (6), a seedling medium used in the seedbed is obtained by blending 5% to 10% of a peat soil into a yellow soil; and a shading degree for the seedbed is configured to ensure a light transmittance of 3% to 10% and a humidity of greater than or equal to 60%.

10. The method according to claim 7, wherein the management in step (7) specifically comprises: after the transplantation, keeping the soil at the specified humidity of greater than or equal to 60%; after the grafted seedling is cultivated for 50 d, spraying the urea with a mass concentration of 0.1% to 0.4% to replenish nutrients, gradually enhancing light, and removing buds and weeds; and after the grafted seedling is cultivated for 3 months, cutting the grafting film, such that the grafting film automatically falls off with a growth of a callus at the grafting interface to prevent a strangulation mark from occurring at a grafting site because the grafting film hinders a normal healing of the grafting interface.

11. The method according to claim 4, wherein the petiole has a length of 0.5 cm and is left for the grafting.

12. The method according to claim 5, wherein the single axillary bud of the scion is 1 cm from a top and 3 cm from a bottom, and the wedge-shaped bevel has the vertical length of 1.5 cm.

13. The method according to claim 8, wherein the seedbed has a height of 15 cm and a width of 1.2 m and is prepared for the transplantation.

\* \* \* \* \*